United States Patent

Mizutani et al.

Patent Number: 5,903,541
Date of Patent: May 11, 1999

[54] DISC CARTRIDGE LID STRUCTURE

[75] Inventors: Hikaru Mizutani, Mino; Kenji Ohta, Otokuni-gun, both of Japan

[73] Assignee: Hitachi Maxell, Ltd., Osaka-fu, Japan

[21] Appl. No.: 08/827,461

[22] Filed: Mar. 28, 1997

[30] Foreign Application Priority Data

Mar. 28, 1996  [JP]  Japan .................... 8-104361

[51] Int. Cl.⁶ ............................. G11B 23/03
[52] U.S. Cl. .................. 369/291; 360/133; 206/308.1
[58] Field of Search ............. 369/291; 360/132, 360/133; 206/308.1, 308.2, 308.3, 387.11

[56] References Cited

U.S. PATENT DOCUMENTS

| | | | |
|---|---|---|---|
| 4,564,878 | 1/1986 | Weavers et al. | 360/132 |
| 5,093,823 | 3/1992 | Ouwekerk et al. | 369/291 |
| 5,150,354 | 9/1992 | Iwata et al. | 369/291 |
| 5,285,918 | 2/1994 | Weisburn et al. | 220/265 |
| 5,445,265 | 8/1995 | Herr et al. | 206/308.1 |
| 5,748,609 | 5/1998 | Tanaka | 369/291 |

Primary Examiner—Stuart S. Levy
Assistant Examiner—William J. Klimowicz

[57] ABSTRACT

A disc cartridge for freely rotatably accommodating a disc-shaped recording medium, which includes a cartridge casing having a disc chamber defined therein for freely rotatably accommodating the recording medium and also a generally U-shaped access opening defined in one of four sides of the cartridge casing, a lid assembly pivotally supported by the cartridge casing for pivotal movement about a pivot pin in a plane substantially parallel to a plane of the cartridge casing for selectively opening and closing the access opening, and a lid lock means provided between the cartridge casing and the lid assembly for locking the lid assembly in a closed position. The lid lock means includes at least one tubular boss having a through-hole defined therein, and an engagement piece accommodated within the through-hole and separably connected to the tubular boss, a part of the engagement piece protruding outwardly from one of opposite ends of the through-hole and engageable in a hole defined in one of top and bottom walls of the cartridge casing which is adjacent to said one of the opposite ends of the through-hole. That part of the engagement piece is engaged in the hole when the lid assembly is held in the closed position, but the engagement piece may be separated from the tubular boss when an external pushing force is applied thereto through the hole.

4 Claims, 3 Drawing Sheets

DISC CARTRIDGE LID STRUCTURE

BACKGROUND OF THE INVENTION

1. (Field of the Invention)

The present invention generally relates to a disc cartridge of a generally rectangular configuration for removably accommodating a disc-shaped recording medium such as, for example, an optical recording disc or a magnetooptical recording disc and, more particularly, to a lid structure for the disc cartridge for selectively opening and closing the access opening leading into the interior of the disc cartridge for removal or replacement of the disc-shaped recording medium.

2. (Description of the Prior Art)

The disc cartridge of the type referred to above is disclosed in, for example, the Japanese Laid-open Patent Publication No. 5-243626, published in 1994. According to this publication, the disc cartridge comprises a generally rectangular flattened casing having an access opening defined at a rear end thereof so as to extend over the entire width thereof. This known disc cartridge also includes a lid connected to the casing for selective pivotal movement between opened and closed positions to allow the disc-shaped recording medium, for example, the optical disc, to be removed from and inserted into the interior of the casing, respectively, through the access opening. The opposite end of the lid is formed with an elastic arm having an engagement pawl formed at one end thereof, which pawl is engageable in an engagement hole defined in the casing to cause the lid to close the access opening. Release of the engagement pawl from the engagement hole to open the access opening can be accomplished by inserting a pressure applying tool such as, for example, a pin into the engagement hole to allow the elastic arm to yield.

The capability of the lid being selectively opened and closed is necessitated to allow an "encased" optical disc, that is purchased, for example, in the form as accommodated within the disc casing, to be replaced with a different, "uncased" optical disc that is separately purchased without the disc casing. As is well known to those skilled in the art, certain optical disc recording and/or reproducing devices (players) require the use of a dedicated disc casing and, on the other hand, not only can optical discs for use therewith be available in the form as encased within such a dedicated disc casing, but they are also available in the form as uncased, that is, without the dedicated disc casing. If the "encased" optical disc has audio and/or video information such as, for example, music and/or computer application software, recorded thereon, the capability of the lid being selectively opened and closed in the dedicated disc casing makes it possible for the user to replace the encased optical disc with an "uncased" blank optical disc so that the user can record audio and/or video information on such blank optical disc on his or her own or at his or her will.

The capability of the lid being selectively opened and closed in the prior art disc cartridge often poses a problem. As described above, the lid employed in the prior art disc cartridge is of a type wherein the elastic arm is elastically deformed or yielded to allow the engagement pawl to disengage from the engagement hole, and this structure makes it difficult to ascertain if the optical disc within the disc cartridge has been replaced with another one once the disc cartridge containing the optical disc has been inserted into the player which may be of a type built in, for example, a computer.

SUMMARY OF THE INVENTION

The present invention has accordingly an essential object to provide an improved disc cartridge of a type including a lid lock means which is capable of allowing the disc player to detect if the optical disc within the disc cartridge has been replaced.

Another important object of the present invention is to provide an improved disc cartridge of the type referred to above in which the lid has a reduced weight to allow the lid to be easily and smoothly operated.

To this end, the present invention provides a disc cartridge for freely rotatably accommodating a disc-shaped recording medium, which includes a cartridge casing having a disc chamber defined therein for freely rotatably accommodating the recording medium and also a generally U-shaped access opening defined in one of four sides of the cartridge casing, a lid assembly pivotally supported by the cartridge casing for pivotal movement about a pivot pin in a plane substantially parallel to a plane of the cartridge casing for selectively opening and closing the access opening, and a lid lock means provided between the cartridge casing and the lid assembly for locking the lid assembly in a closed position.

The lid lock means includes at least one tubular boss having a through-hole defined therein, and an engagement piece accommodated within the through-hole and separably connected to the tubular boss, a part of the engagement piece protruding outwardly from one of opposite ends of the through-hole and engageable in a hole defined in one of top and bottom walls of the cartridge casing which is adjacent to said one of the opposite ends of the through-hole. That part of the engagement piece is engaged in the hole when the lid assembly is held in the closed position, but the engagement piece may be separated from the tubular boss when an external pushing force is applied thereto through the hole.

In a preferred embodiment of the present invention, the access opening is of a generally U-shaped configuration including a major portal area 5a, extending a distance substantially equal to the length of said one of the four sides of the cartridge casing, and side portal areas communicated with respective opposite ends of the major portal area and lying perpendicular to the major portal area. The lid assembly includes at least one main wall adapted to be received in the major portal area to close the major portal area and side walls extending transversely from respective opposite ends of the main wall and adapted to be received in the associated side portal areas to close the side portal areas, and inner arcuate walls each curved to follow the curvature of the disc-shaped recording medium. Each of the inner arcuate walls having one end continued to one end of the associated side wall remote from the main wall. The lid assembly has a void delimited by the main wall, the side wall and the inner arcuate wall.

Preferably, the engagement piece is connected with the tubular boss through a thin-walled, breakable connecting piece.

According to the present invention, since design has been made that the engagement pieces can be engaged in a top or bottom hole 27 or 29 defined in the cartridge casing so long as or when the lid assembly is moved to the closed position, the lid assembly can be assuredly closed to avoid an accidental opening thereof. Where the encased optical disc is desired to be replaced, the engagement pieces have to be purposefully broken away and, therefore, the presence or absence of the engagement pieces can be detected by the detecting element of the disc player when such detecting element is inserted into the top or bottom hole.

Moreover, the engagement pieces separated from the associated tubular bosses can be removed out of the through-holes in the tubular bosses when the lid assembly is subsequently opened, at which time the separated engagement pieces can fall down by gravity. Thus, the separated engagement pieces will not remain within the cartridge casing and, therefore, there is no possibility that the lid assembly being then pivoted towards the closed position may bite the separated engagement pieces.

Furthermore, the formation of the voids between the main walls and the inner arcuate walls in the lid assembly is effective to reduce the weight of the lid assembly enough to allow the lid assembly to be smoothly and easily operated. The through-holes accommodating therein the respective engagement pieces are defined in the tubular bosses of a length corresponding to the distance between the inner surfaces of the top and bottom walls of the cartridge casing and, accordingly, even when an external load is applied to one or both of the top and bottom walls and of the cartridge casing, respective portions of the top and/or bottom walls which are aligned with the associated tubular bosses will not be deformed.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
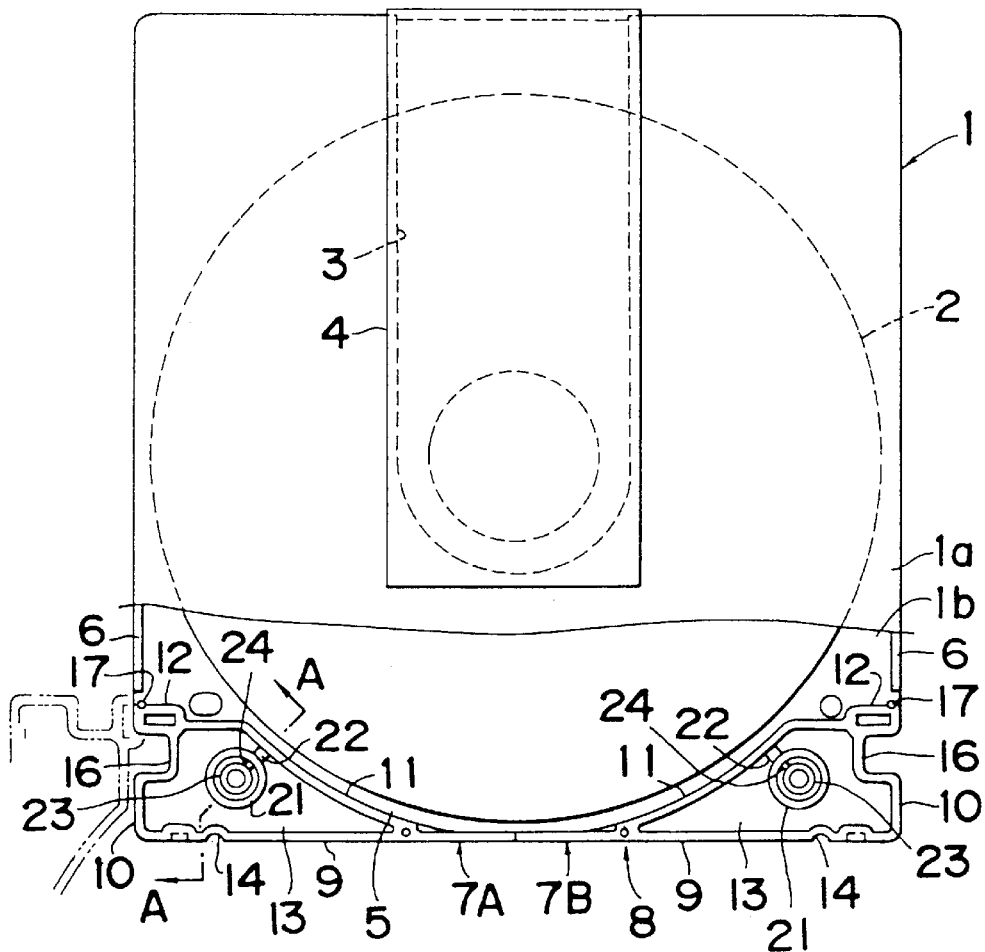
FIG. 1 is a schematic top plan view, with a portion cut away, of a disc cartridge according to a preferred embodiment of the present invention, with lids held in a closed position.

Referring first to FIGS. 1 to 4, a disc-shaped optical or magnetooptical recording medium is shown in the form of, for example, an optical disc 2 having first and second major surfaces opposite to each other with audio and/or video signals recorded on each major surface thereof. This optical disc 2 is freely rotatably accommodated within a disc cartridge made of a moldable plastic material and including a generally rectangular flattened cartridge casing 1.

The cartridge casing 1 is made up of top and bottom panels 1a and 1b joined together by means of left and right side walls 6 and a front side wall, with an access opening 5 defined in opposition to the front side wall for selective removal or insertion of the optical disc 2 from or into the interior of the cartridge casing. The disc cartridge has generally rectangular access windows 3 defined respectively in the top and bottom panels 1a and 1b at a location intermediate of the width of the disc cartridge for the access of read/write heads (not shown) to the associated major surfaces of the optical disc 2. The access windows 3 are normally closed by a slide shutter 4 that is locked at a closed position by a suitable lock mechanism (not shown) when the disc cartridge is not loaded in an information recording and/or reproducing machine.

The access opening 5 is adapted to be selectively opened and closed by a lid assembly 7 as will be described later and is made up of a major portal area 5a of a size sufficient to occupy an entire width of the rear end of the cartridge casing 1 and left and right side portal areas 5b open laterally outwardly at respective rear ends of left and right side walls 6 of the cartridge casing 1. Thus, the access opening 5, when viewed from above as shown in FIG. 1, represents a generally U-shaped configuration extending from a rear end of one side wall 6 of the cartridge casing 1 to a rear end of the opposite side wall 6 of the cartridge casing 1 after having traversed the rear end of the cartridge casing 1.

The lid assembly 7 is of a two-piece design including a first lid 7A and a second lid 7B both made of plastics and operable in a manner similar to a casement window. As shown in FIG. 1, each lid 7A and 7B is of a skeleton structure including a main wall 9, a side wall 10 continued transversely from one of opposite ends of the main wall 9 so as to extend towards the adjacent side wall 6 of the cartridge casing 1, an inner arcuate wall 11 defined inwardly of the main wall 9 and curved to follow the curvature of the optical disc 2 to thereby regulate the position of the optical disc 2 within the cartridge casing 1, and a pivot base wall 12 extending substantially parallel to the main wall 9 and connecting respective front ends of the side and inner arcuate walls 10 and 11 together. The main wall 9 of each lid 7A and 7B is so designed as to be received in the major portal area 5a to close the latter when the respective lid 7A and 7B is pivoted to a closed position, whereas the side wall 10 of each lid 7A and 7B is so designed as to be received in the associated side portal area 5b to close the latter when the respective lid 7A and 7B is pivoted to a closed position.

In order to reduce the volume and weight of the lid assembly 7, a void 13 is defined in each of the first and second lids 7A and 7B. This void 13 in each of the first and second lids 7A and 7B is of a generally triangular shape and delimited by the walls 9, 10, 11 and 12 forming the respective lid 7A and 7B to thereby render the respective lid 7A and 7B to be of the skeleton structure. The main wall 9 of each lid 7A and 7B is formed with an finger access recess 14 to which a finger is accessible when the associated lid 7A and 7B is desired to be opened. The side wall 10 of each lid 7A and 7B is formed with a generally U-shaped cutout 16.

Figure 4:
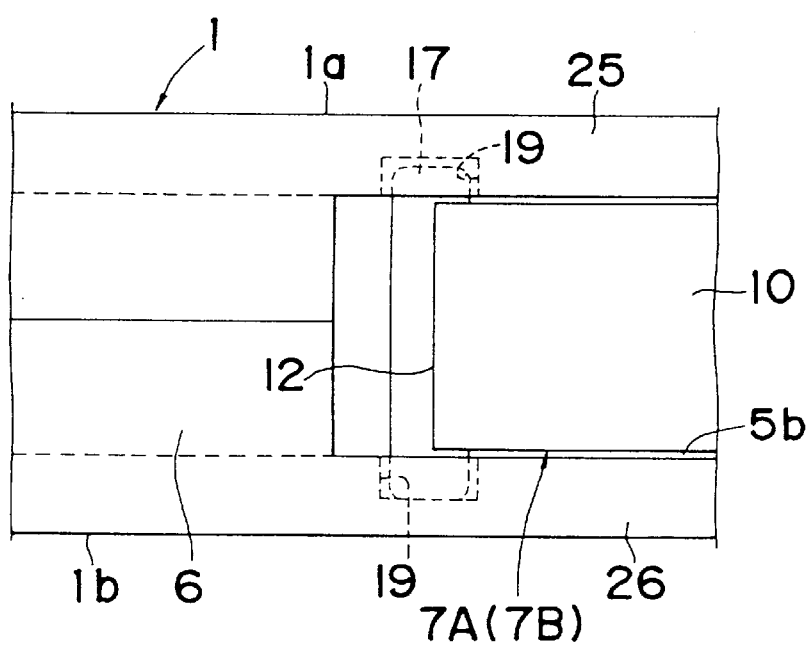
FIG. 4 is a side view of another portion of the disc cartridge shown in FIG. 1.

As best shown in FIG. 4, a corner region of each of the first and second lids 7A and 7B where the side wall 10 and the pivot base wall 12 intersect each other has stud shafts 17 formed therein so as to extend outwardly in opposite directions. These stud shafts 17 are pivotally received in respective bearing holes 19 each defined in a portion of the top or bottom panels 1a and 1b adjacent a rear end of the associated side wall 6, so that the corresponding lid 7A or 7B can be pivoted about a common axis of those stud shafts 17 between the opened and closed positions. Thus, it will readily be seen that the lids 7A and 7B can be individually pivoted in a plane substantially parallel to the plane of the cartridge casing 1 between the opened and closed positions which are spaced about or substantially 90° about the respective common axes each defined by the stud shafts 17.

Figure 2:
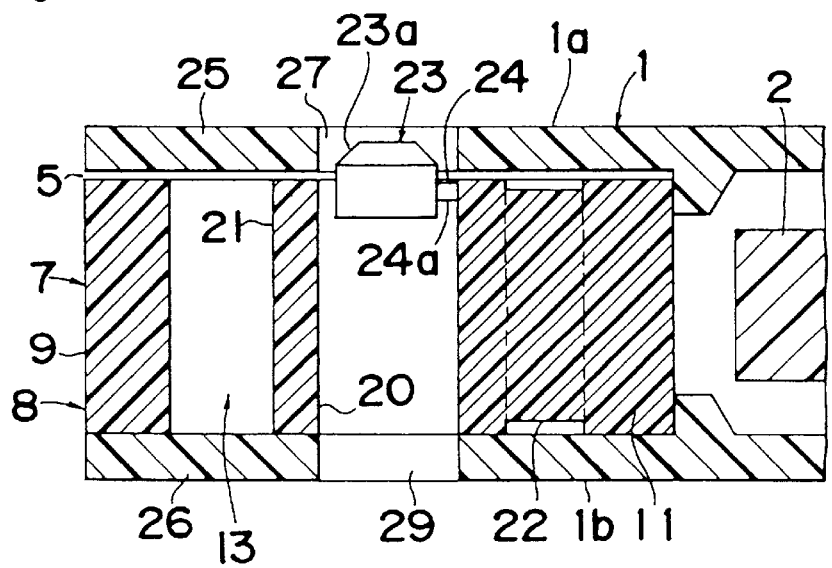
FIG. 2 is a cross-sectional view, on an enlarged scale, taken along the line A—A in FIG. 1.
Figure 3:
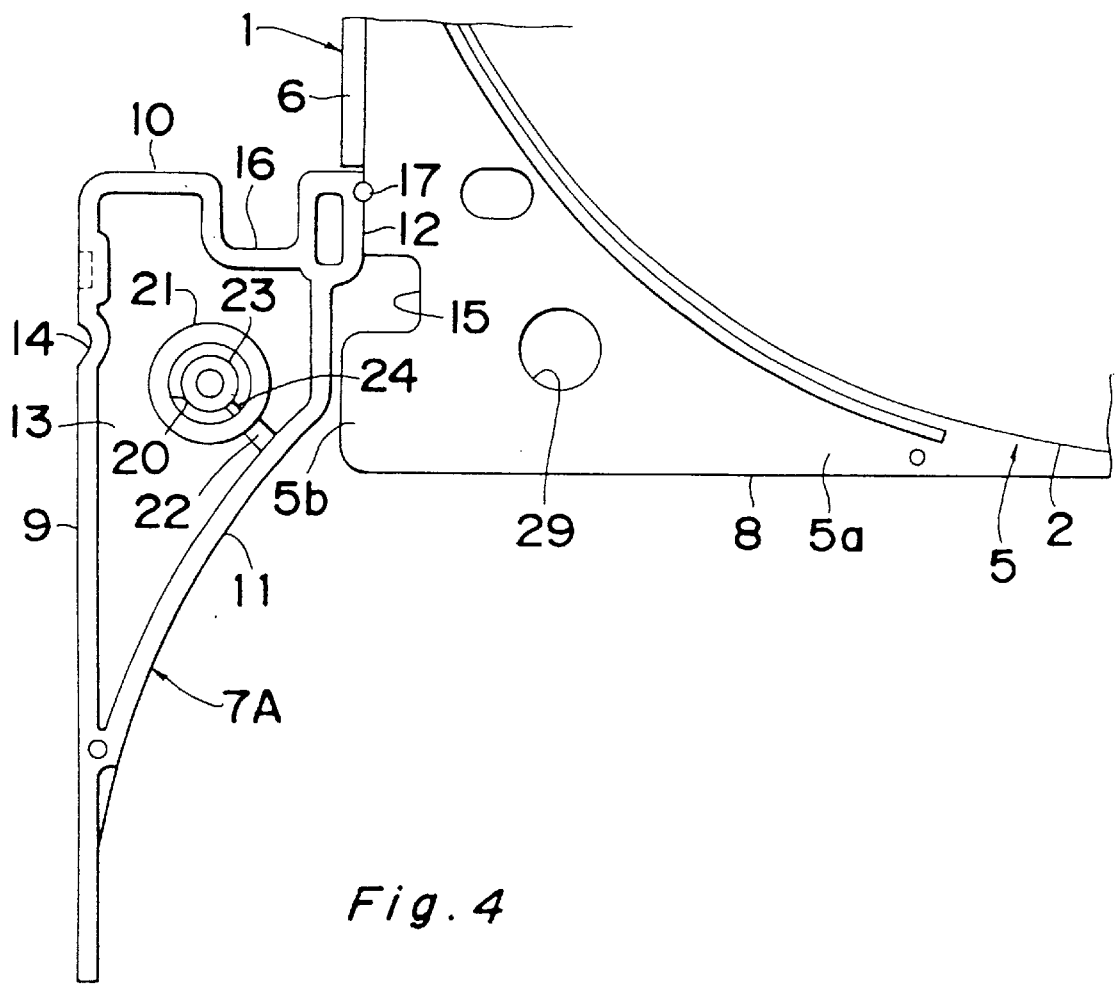
FIG. 3 is a fragmentary enlarged top plan view of one corner region of the disc cartridge shown in FIG. 1, showing one of the lids held in an opened position.

To keep the first and second lids 7A and 7B closed once they have been moved to their closed position, a lock mechanism is employed and disposed between the void 13 in each lid 7A and 7B and the cartridge casing 1. As best shown in FIGS. 2 and 3, a tubular boss 21 of a generally cylindrical or square-sectioned configuration having a through-hole 20 defined therein so as to extend completely across the length thereof is disposed within each void 13 and is integrally connected with the inner arcuate wall 11 through a connecting rib 22. This tubular boss 21 has an engagement piece 23 accommodated within the through-hole 20 and is supported in position by means of a breakable connecting piece 24 which connects the engagement piece 23 with the tubular boss 21. It is to be noted that the tubular boss 21, the connecting rib 22, the engagement piece 23 and the breakable connecting piece 24 are integrally formed with each of the lids 7A and 7B.

As best shown in FIG. 2, each engagement piece 23 has one end formed with a truncated cone 23a and is accommodated within the through-hole 20 in the respective tubular boss 21 with the truncated cone 23a protruding upwardly from an upper end of the through-hole 20. The breakable connecting piece 24 has an undersurface formed with a groove 24a along which the connecting piece 24 can, when an external pushing force is applied thereto, be broken to separate the engagement piece 23 from the tubular boss 21.

Top and bottom walls 25 and 26 of the cartridge casing 1 are formed with top and bottom holes 27 and 29 which are aligned with the associated through-holes 20 when the lids 7A and 7B are held in the closed positions, respectively. The truncated cones 23a of the respective engagement pieces 23 in the associated lids 7A and 7B, which protrude outwardly from the associated through-holes 20 as hereinbefore described, are situated within the top holes 27 defined in the top wall 25.

When each of the lids 7A and 7B is moved from the closed position towards the opened position or from the opened position towards the closed position, the truncated cone 23a in the respective lid 7A or 7B is slidingly engaged with an inner wall surface of the top wall 25 adjacent the associated top hole 27 wherefor the breakable connecting piece 24 is elastically deformed, but not being broken, to allow the truncated cone 23a to pass underneath to engage in or disengage from the top hole 27. Accordingly, engagement of the truncated cone 23a of the engagement piece 23 in each lid 7A or 7B within the associated top hole 27 allows the associated lid 7A or 7B to be held in the closed position. However, when while the latter is held in the closed position, the external pushing force is applied to the truncated cone 23a in any one of the lids 7A and 7B to such an extent that a top face of the truncated cone 23a of the engagement piece 23 comes to a level far below a bottom end of the top hole 27, stress set-up occurs in the breakable connecting piece 24 causing the latter to break along the groove 24a to thereby separate the engagement piece 23 from the tubular boss 21.

Since the engagement pieces 23 in the lids 7A and 7B are engaged in the respective top holes 27, the lids 7A and 7B can be assuredly retained in the closed positions and will not open accidentally. When the lids 7A and 7B are desired to be opened in readiness for replacement of the optical disc 2, the external pushing force, for example, a finger pressure, should be applied successively to the truncated cones 23a of the respective engagement pieces 24 through the associated top holes 27 to allow the engagement pieces 24 to be depressed. However, if the finger pressure is sufficient to allow the top faces of the truncated cones 23a of the respective engagement pieces 23 to come to a level far below the bottom ends of the top holes 27, the breakable connecting pieces 24 are broken along the corresponding grooves 24a to separate the engagement pieces 23 from the associated tubular bosses 21.

The engagement pieces 23 so separated from the associated tubular bosses 21 can be removed out of the through-holes 20 when the lids 7A and 7B are subsequently opened, at which time the separated engagement pieces 23 fall down by gravity. Thus, the separated engagement pieces 23 will not remain within the cartridge casing 1 and, therefore, there is no possibility that one or both of the lids 7A and 7B being then pivoted towards the closed position may bite the separated engagement piece 23.

As hereinbefore described, each of the lids 7A and 7B has the void 13 for reducing the weight and volume of the respective lid 7A and 7B. In view of the presence of the void 13 in each lid 7A and 7B, a portion of one of the top and bottom walls 25 and 26 which is aligned with the void 13 in each lid 7A and 7B may be susceptible to inwardly deformation when a relatively heavy load is applied to such one of the top and bottom walls 25 and 26. However, in the present invention, the tubular boss 21 disposed within the respective void 13 provides a reinforcement to avoid any possible inward deformation of any of the top and bottom walls 25 and 26 as clearly shown in FIG. 2 because the tubular boss 21 has a length corresponding to the distance between respective inner surfaces of the top and bottom walls 25 and 26.

When the lids 7A and 7B are opened after the engagement pieces 23 have been broken off, replacement of the optical disc 2 is possible through the access opening 5. If the encased optical disc 2 has been replaced with the uncased optical disc, the cartridge casing 1 is no longer provided with the engagement pieces 23 and, therefore, the presence or absence of the engagement pieces can easily and readily be detected by a detecting element provided in the disc player, provided that the detecting element is so designed as to be engaged in the top holes 27. Thus, by detecting the presence or absence of the engagement pieces 23, whether or not the optical disc 2 has been replaced can readily be determined.

It is to be noted that in describing the foregoing embodiment of the present invention, each of the tubular bosses 21 has been shown and described as connected integrally with the inner arcuate wall 11 of the associated lid 7A or 7B through the connecting rib 22. However, each tubular boss 21 may be similarly connected with a portion of the main wall 9 or with both of the inner arcuate wall 11 and the main wall 9. In addition, although in the foregoing embodiment each of the engagement pieces 23 has been described as having the truncated cone 23a protruding upwardly outwardly from the through-hole 20 so as to occupy a position inside the top hole 27, it may have the truncated cone protruding downwardly outwardly from the through-hole 20 so as to occupy a position inside the bottom hole 29.

The use of the two lids 7A and 7B designed to be swung in respective directions opposite to each other in a fashion similar to the casement window is particularly advantageous in that the radius of swing of each lid 7A and 7B can be minimized and, therefore, the angle through which each lid 7A and 7B swings between the closed and opened positions may be 90°. This feature makes it possible to minimize the space outside the cartridge casing 1 where the lids 7A and 7B when moved to the opened positions occupy, to thereby avoid any possible contact of one or both of the lids 7A and 7B with an outside obstruction. However, the present invention may not be always limited thereto and may employ the lid assembly comprising a single lid 7a such as shown in FIG. 5.

Figure 5:
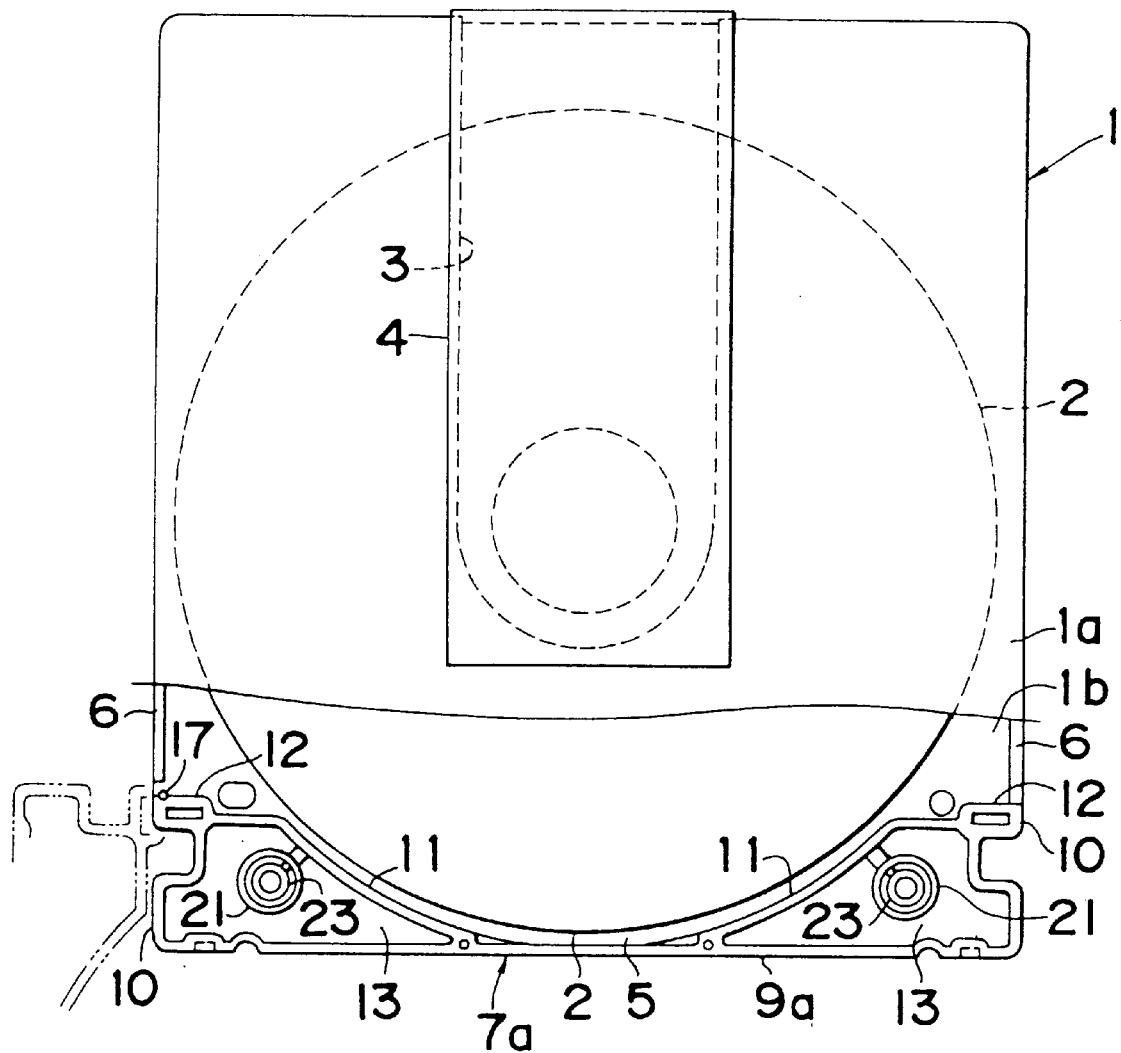
FIG. 5 is a view similar to FIG. 1, showing the disc cartridge according to another preferred embodiment of the present invention.

Referring now to FIG. 5, the single lid 7a shown therein includes a main wall 9a of a length corresponding to the width of the cartridge casing 1 and having end portions opposite to each other. Each of the opposite end portions of the main wall 9a has a skeleton structure including a side wall 10 continued transversely from one of opposite ends of the main wall 9a so as to extend towards the adjacent side wall 6 of the cartridge casing 1, an inner arcuate wall 11 defined inwardly of the main wall 9a and curved to follow the curvature of the optical disc 2 to thereby regulate the position of the optical disc 2 within the cartridge casing 1, and a pivot base wall 12 extending substantially parallel to the main wall 9a and connecting respective front ends of the side and inner arcuate walls 10 and 11 together. In any event, the lid 7a shown in FIG. 5 may be considered a single integer of the first and second lids 7A and 7B employed in the foregoing embodiment.

In order for the lid 7a to be selectively opened and closed, stud shafts 17 are formed only in a corner region of the lid 7a where the side wall 10 and the pivot base wall 12 intersect each other at, for example, the left end portion of the lid 9a. The tubular boss 21 including the engagement piece 23 are employed within each of the voids 13, it being however to be noted that it may be disposed only one of the voids 13 if so desired.

Thus, it will readily be seen that the lid 7a can be pivoted in a plane substantially parallel to the plane of the cartridge casing 1 between the opened and closed positions which are spaced about or substantially 180° about the respective common axes of the stud shafts 17. In this embodiment, however, the access opening 5 has been shown and described as formed at the rear end 8 of the cartridge casing 1 may be defined at any one of the side walls 6 of the cartridge casing 1.

According to the present invention, since design has been made that the engagement pieces 23 can be engaged in the top or bottom holes 27 or 29 defined in the cartridge casing 1 so long as or when the lid assembly is moved to the closed position, the lid assembly can be assuredly closed to avoid an accidental opening thereof. Where the encased optical disc 2 is desired to be replaced, the engagement pieces 23 have to be purposefully broken away and, therefore, the presence or absence of the engagement pieces 23 can be detected by the detecting element of the disc player when such detecting element is inserted into the top or bottom holes 27 or 29.

Moreover, the engagement pieces 23 separated from the associated tubular bosses 21 can be removed out of the through-holes 20 in the tubular bosses 21 when the lid assembly is subsequently opened, at which time the separated engagement pieces 23 can fall down by gravity. Thus, the separated engagement pieces 23 will not remain within the cartridge casing 1 and, therefore, there is no possibility that the lid assembly being then pivoted towards the closed position may bite the separated engagement pieces 23.

Furthermore, the formation of the voids 13 between the main walls 9 and the inner arcuate walls 11 in the lid assembly is effective to reduce the weight of the lid assembly enough to allow the lid assembly to be smoothly and easily operated. The through-holes 20 accommodating therein the respective engagement pieces 23 are defined in the tubular bosses 21 of a length corresponding to the distance between the inner surfaces of the top and bottom walls 25 and 26 of the cartridge casing 1 and, accordingly, even when an external load is applied to one or both of the top and bottom walls 25 and 26 of the cartridge casing 1, respective portions of the top and/or bottom walls 25 and 26 which are aligned with the associated tubular bosses 21 will not be deformed.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A disc cartridge for freely rotatably accommodating a disc-shaped recording medium, which comprises:

a cartridge casing having a disc chamber defined therein for freely rotatably accommodating the recording medium and also having front and rear ends opposite to each other and left and right sides opposite to each other, said cartridge casing having a generally U-shaped access opening defined in the rear end thereof;

a lid assembly pivotally supported by the cartridge casing for pivotal movement about a pivot pin in a plane substantially parallel to a plane of the cartridge casing for selectively opening and closing the access opening;

a lid lock means provided between the cartridge casing and the lid assembly for locking the lid assembly in a closed position;

wherein said lid lock means includes at least one tubular boss having a through-hole defined therein, and an engagement piece accommodated within the through-hole and separably connected to the tubular boss, a part of said engagement piece protruding outwardly from one of opposite ends of the through-hole and engageable in a hole defined in one of top and bottom walls of the cartridge casing which is adjacent to said one of the opposite ends of the through-hole;

wherein said part of the engagement piece is engaged in said hole when the lid assembly is held in the closed position, and said engagement piece is adapted to separated from the tubular boss when an external pushing force is applied thereto through said hole.

2. The disc cartridge as claimed in claim 1, wherein said engagement piece is connected with the tubular boss through a thin-walled, breakable connecting piece.

3. A disc cartridge for freely rotatably accommodating a disc-shaped recording medium, which comprises:

a cartridge casing having a disc chamber defined therein for freely rotatably accommodating the recording medium, said disc chamber opening outwardly through an access opening defined in one of four sides of the cartridge casing, said access opening being of a generally U-shaped configuration including a major portal area extending a distance substantially equal to the length of said one of the four sides of the cartridge casing, and side portal areas communicated with respective opposite ends of the major portal area and lying perpendicular to the major portal area;

a lid assembly pivotally supported by the cartridge casing for pivotal movement about a pivot pin in a plane substantially parallel to a plane of the cartridge casing for selectively opening and closing the access opening, said lid assembly including at least one main wall adapted to be received in the major portal area to close the major portal area, side walls extending transversely from respective opposite ends of the main wall and adapted to be received in the associated side portal areas to close the side portal areas, and inner arcuate walls each curved to follow the curvature of the disc-shaped recording medium, each of said inner arcuate walls having one end continued to one end of the associated side wall remote from the main wall, said lid assembly having a void delimited by the main wall, the side wall and the inner arcuate wall;

a tubular boss having a through-hole defined therein, said tubular boss being accommodated within each of the voids and connected integrally with at least one of the main wall and the inner arcuate wall; and a breakable engagement piece accommodated within the through-hole in the tubular boss and separably connected with the tubular boss, a part of said engagement piece protruding outwardly from one of opposite ends of the through-hole and engageable in a hole defined in one of top and bottom walls of the cartridge casing which is adjacent to said one of the opposite ends of the through-hole.

4. The disc cartridge as claimed in claim 3, wherein said engagement piece is connected with the tubular boss through a thin-walled, breakable connecting piece.

* * * * *